No. 665,741. Patented Jan. 8, 1901.
I. V. HOLMES.
PURIFYING APPARATUS.
(Application filed Aug. 18, 1899.)
(No Model.) 2 Sheets—Sheet 1.
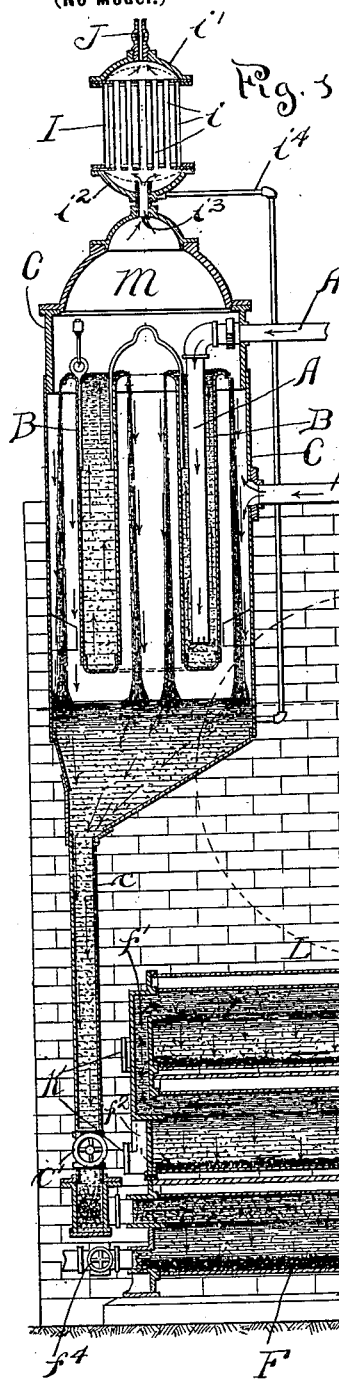
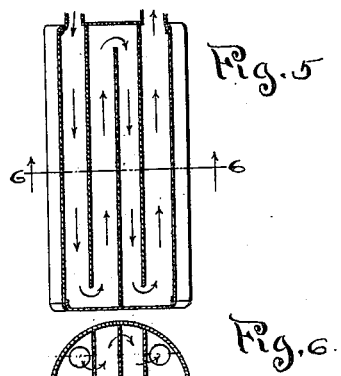
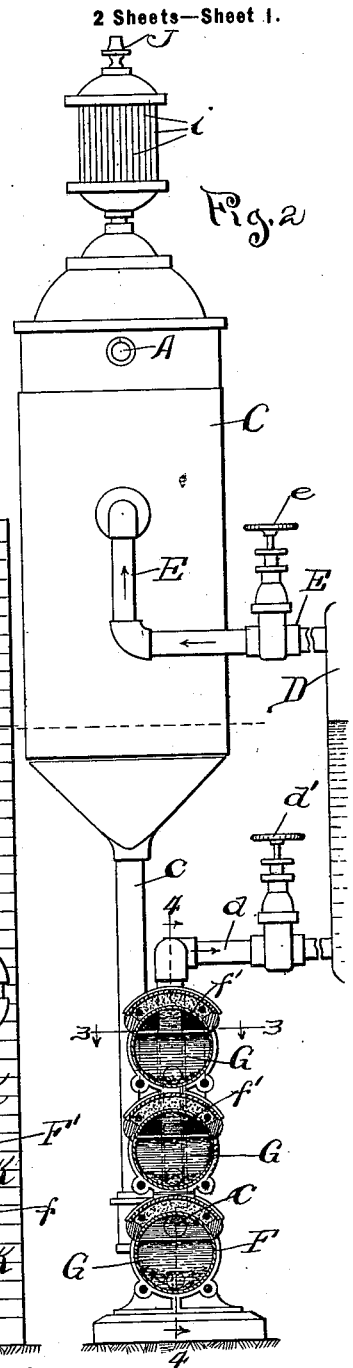
Witnesses:— Inventor:—
Ira D. Perry. Isaac V. Holmes
J B Weir By Charles T. Hill, Atty.
THE NORRIS PETERS CO., PHOTO-LITHO., WASHINGTON, D. C.

No. 665,741. Patented Jan. 8, 1901.
I. V. HOLMES.
PURIFYING APPARATUS.
(Application filed Aug. 18, 1899.)
(No Model.) 2 Sheets—Sheet 2.
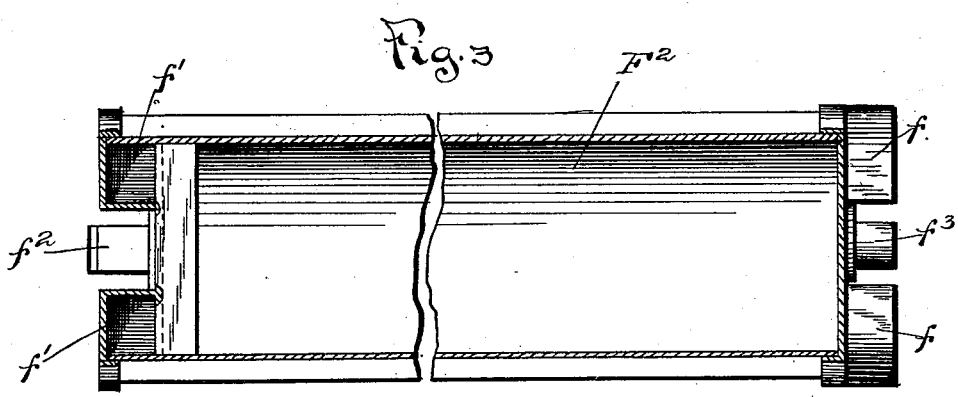
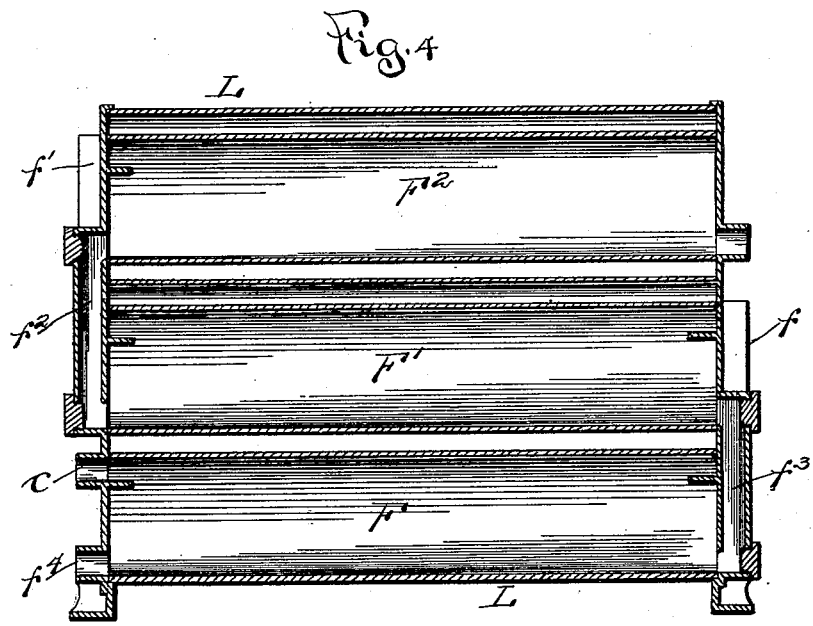
Witnesses
JB Weir
Ira D Perry
Inventor
Isaac V. Holmes.
By Charles L. Stiel, Atty

UNITED STATES PATENT OFFICE.

ISAAC V. HOLMES, OF CHICAGO, ILLINOIS.

PURIFYING APPARATUS.

SPECIFICATION forming part of Letters Patent No. 665,741, dated January 8, 1901.

Application filed August 18, 1899. Serial No. 727,730. (No model.)

*To all whom it may concern:*

Be it known that I, ISAAC V. HOLMES, a citizen of the United States, residing at Chicago, in the county of Cook, State of Illinois, have invented certain new and useful Improvements in Purifying Apparatus, of which the following is a specification.

Referring to the accompanying drawings, wherein like reference-letters indicate the same or corresponding parts, Figure 1 is a vertical section of my improved water-purifier. Fig. 2 is a side elevation of a portion of the parts shown in Fig. 1, partly shown in vertical transverse section. Fig. 3 is a longitudinal section taken on the line 3 3 of Fig. 2 and viewed in the direction indicated by the arrows at the sides thereof. Fig. 4 is a vertical section taken on the line 4 4 of Fig. 2 and viewed in the direction indicated by the arrows at the sides thereof. Fig. 5 is a longitudinal section illustrating one form of equivalent of the eliminating-chambers F F' F². Fig. 6 is a vertical transverse section of the equivalent form of eliminating-chambers shown in Fig. 5, taken on line 6 6 thereof and viewed in the direction indicated by the arrows at the sides of said figure.

The object of my invention is to separate from water or other liquids mineral and vegetable matter held in suspension therein; and to that end it consists, essentially, in the separation of said mineral and vegetable particles from their suspending liquid, in the first instance by means of live steam, and finally by passing said steam-heated liquid over a cooler liquid, and it further consists in the features of construction and combination hereinafter to be more fully described, and pointed out in the claims hereto annexed.

My invention more particularly applies to the separation of mineral and vegetable particles from water intended to be used for the generation of steam; but the principle of my invention covers the separation of said particles for the purpose of accumulating the same for various uses or freeing liquid of whatsoever kind from extraneous and heavier matter.

I will now describe the principle of my invention in connection with the particular use thereof.

Referring to the drawings, A is a water-supply pipe.

B is an annular chamber suspended or otherwise contained within the chamber C.

D is a boiler or steam-generator of any kind, tubular or flue; E, a steam pipe or passage for the conveyance of steam from the boiler D to the chamber C, communication therewith being controlled by means of the valve $e$; $c$, a pipe or passage extending from the base of the chamber C to the chamber F, its communication therewith being controlled by the valve $c'$, a series of eliminating-chambers L, formed of the separate eliminating-chambers F F' F², communicating, respectively, with one another by means of the pipes or passages $f$ $f'$ and also by means of the pipes or passages $f^2 f^3$, the chamber F² communicating as well with the boiler D by means of the pipe or passage $d$, said communication being controlled by the valve $d'$.

The operation of my device is as follows: Liquid from a tank or other suitable source is delivered through the pipe A to the annular chamber B, over the top or rim of which it is precipitated when the chamber has been filled. Live steam admitted from the boiler D by means of the pipe or passage $d$ to the chamber C fills said chamber, and coming in contact with the particles of liquid dripping from the rim or top of the annular chamber B it creates an active disturbance among the same, liberating therefrom the resultant gases and such particles of mineral and vegetable matter as may have been held in suspension in the liquid, in addition to which it heats the annular chamber B and the liquid contained therein, thereby aiding in the separation of the parts of the liquid. The water or the liquid thus acted upon as it falls from the top of the annular chamber B passes into the passage $c$ and thence to the chamber F, the lower part of the chambers F F' F² containing a liquid G of a lower temperature than that introduced through the passage C. It is a well-known physical fact "that a heated stratum of water will flow over the top surface of a cold stratum and not perceptibly disturb the same or impart to it its heat." The same is true of any liquid. The liquid introduced through the passage $c$ is by contact with the live steam, of a higher temperature than the liquid contained in the chambers F F' F², and being subjected to the pressure caused by the hydraulic head produced in the chamber C by the delivery thereinto of the water from the pipe A it passes across the cooler liquid contained within the chamber F, thence to the chamber F' by means of the passage $f$, across the cooler liquid contained within said chamber, through the passage $f'$ to the chamber F², across the cooler liquid therein to the pipe or passage $d$, the particles of mineral and heavier vegetable matter H because of their specific gravity, gradually falling from the stratum of warm liquid in which they are held in suspension to the stratum of cooler liquid within the chambers F F' F² and settling at the bottom thereof, the purified water passing into the passage $d$, as described.

Having thus described the principle of my invention, I now proceed to describe certain of the lesser features of construction and operation.

As the contact of the live steam admitted to the chamber C with the particles of water dripping from the annular chamber B releases gases from the water, I have provided the following means to draw off said gases: Referring to Fig. 1, I is a gas-eliminator; $i$, a series of pipes of comparatively small diameter arranged sufficiently far apart to permit air to freely circulate between them, said pipes having their ends respectively opening into the cap $i'$ and base $i^2$, and J is a petcock. The steam within the chamber C enters the passage $i^3$, bearing with it the gases eliminated from the water, and enters the series of small pipes $i$, which pipes, through contact with the atmosphere remaining comparatively cool, act to condense the steam, which when condensed falls into the base $i^2$, from which point it may be discharged by means of the pipe or passage $i^4$, and delivered at any desired point, the remaining gases escaping from the petcock J.

In order to fill the bottoms of the chambers F F' F² with water in the first instance, there are two ways in which the same may be done. By means of the valve $d'$ and the passage $d$ water may be conveyed direct from the boiler to the chambers, or the water may be obtained by means of the pipe A, and being thus obtained first enters the annular chamber B, from which it passes to the pipe or passage $c$, thence into the chamber F, filling the same, thence into the passage $f$ to the chamber F', and after having filled it thence through the passage $f'$ into the chamber F², which in turn it fills. The latter method is preferable. When the eliminating-chambers have been thus filled with cold water, steam may be admitted to the chamber C by means of the pipe E, and the operation of the device will then be as previously described.

In order to remove the sediment collected at the bottom of the chambers F F' F², I prefer to employ a reverse current of water, and to that end, referring again to the drawings, I construct a passage $f^2$, leading from the bottom of the chamber F² to the bottom of the chamber F', and a similar passage $f^3$, leading from the bottom of the chamber F' to the bottom of the chamber F.

To cleanse the chambers, by opening the valve $d'$ water is caused to flow through the pipe $d$ into the chamber F², thence through the passage $f^2$ to the chamber F', thence through the passage $f^3$, thence through the chamber F, and into or through the pipe or passage $f^4$, from which it may be discharged at any desired point, the action of this reverse current being to carry with it sediment contained at the bottom of the chambers referred to.

In addition to employing the reverse current for the purpose of cleaning the eliminating-chambers referred to I prefer to make use of plugs or caps K, which may be removed and any suitable instrument inserted within the chambers to remove the sediment.

It is obvious that the number and dimensions of the chambers F F' F² forming the series L are optional and dependent only upon the quantity of liquid from which the extraneous matter is desired to be eliminated; that instead of the gas-eliminator I one of any suitable form that will perform the required functions may be employed; that the sediment-eliminating chambers may be contained within a single shell or may closely approximate or be far removed from each other; that the pipe or passage $d$ may be led either to the steam-generator or to any desired point—such, for instance, as a railway water-tank—and it is further obvious that the number, size, and general form of the various parts of my device and their relation to each other may be greatly varied without departing from the principle of the invention.

Referring to Figs. 5 and 6 of the drawings, the same represent one way in which the eliminating-chambers may be confined within a single shell or chamber.

The method of extracting gases and mineral, vegetable, and other matter from liquid in which the same is held in suspension by first heating the liquid to be purified and then forcing it across liquid of lower temperature will hereafter be made by me the subject-matter of a separate application for Letters Patent.

Having thus described the principle of my invention and set forth one way in which it may be put into practice, what I claim as new, and desire to secure by Letters Patent, is—

1. In a liquid-purifying apparatus, the combination of a suitable heater adapted to heat the liquid to be purified; a chamber, or chambers, connected to said heater and containing a liquid of lower temperature than the liquid in the heater; and means whereby heated liquid from the heater may be forced across the liquid of lower temperature, substantially as and for the purpose described.

2. In a liquid-purifying apparatus, the combination of a suitable heater adapted to heat the liquid to be purified; means for eliminating gases from said liquid; a chamber, or chambers, connected to said heater and containing a liquid of lower temperature than the liquid in the heater; and means whereby the heated liquid, after purification from its gases, may be forced across the liquid of lower temperature, substantially as and for the purpose described.

3. In a liquid-purifying apparatus, the combination of a suitable heater adapted to heat the liquid to be purified; a chamber, or chambers, connected to said heater and containing a liquid of lower temperature than the liquid in the heater; means whereby heated liquid from the heater may be forced across the liquid of lower temperature; and means whereby sediment precipitated into the liquid of lower temperature may be mechanically removed from the chamber, or chambers, substantially as described.

4. In a liquid-purifying apparatus, the combination of a suitable heater adapted to heat the liquid to be purified; a chamber, or chambers, connected to said heater and containing a liquid of lower temperature than the liquid in the heater; means whereby heated liquid from the heater may be forced across the liquid of lower temperature; and means whereby sediment precipitated into the liquid of lower temperature may be manually or mechanically removed from the chamber, or chambers, substantially as described.

5. In a liquid-purifying apparatus, the combination of a suitable heater adapted to heat the liquid to be purified; means for eliminating gases from said liquid; a chamber, or chambers, connected to said heater and containing a liquid of lower temperature than the liquid in the heater; means whereby the heated liquid, after purification from its gases, may be forced across the liquid of lower temperature; and means whereby sediment precipitated into the liquid of lower temperature may be mechanically removed from the chamber, or chambers, substantially as described.

6. In a liquid-purifying apparatus, the combination of a suitable heater adapted to heat the liquid to be purified; means for eliminating gases from said liquid; a chamber, or chambers, connected to said heater and containing a liquid of lower temperature than the liquid in the heater; means whereby the heated liquid, after purification from its gases, may be forced across the liquid of lower temperature; and means whereby sediment precipitated into the liquid of lower temperature may be manually or mechanically removed from the chamber, or chambers, substantially as described.

7. In a liquid-purifying apparatus, the combination of a suitable heater adapted to heat the liquid to be purified; a chamber, or chambers, connected to said heater and containing a liquid of lower temperature than the liquid in the heater; means whereby the heated liquid from the heater may be forced across the liquid of lower temperature; and a passage, or passages, through which liquid may be admitted to the chamber, or chambers, in a direction opposite to the direction of the liquid from the heater, with sufficient force to carry with it sediment contained within the chamber, or chambers, and discharge the same therefrom, substantially as and for the purpose described.

8. In a liquid-purifying apparatus, the combination of a suitable heater adapted to heat the liquid to be purified; means for eliminating gases from said liquid; a chamber, or chambers, connected to said heater and containing a liquid of lower temperature than the liquid in the heater; means whereby the heated liquid, after purification from its gases, may be forced across the liquid of lower temperature; and a passage, or passages, through which liquid may be admitted to the chamber, or chambers, in a direction opposite to the direction of the liquid from the heater, with sufficient force to carry with it sediment contained within the chamber, or chambers, and discharge the same therefrom, substantially as and for the purpose described.

9. In a liquid-purifying apparatus, the combination of the following elements, viz: a steam-generator D; a pipe or passage E; a chamber C; an annular chamber B, within said chamber C; a gas-eliminator I; pipes or passages A, c; one or more series L of eliminating-chambers, communicating with the passage c and the pipe or passage d; and means whereby mineral and vegetable matter and gases contained within the liquid entering the chamber C and annular chamber B, through the passage A, will be liberated therefrom, substantially as and for the purpose described.

10. In a liquid-purifying apparatus, the combination of the following elements, viz: a steam-generator D; a chamber C; an annular chamber B, within said chamber C; a gas-eliminator I; pipes or passages A c; one or more series L of eliminating-chambers, communicating with the passage c and the pipe or passage d; and a pipe or passage E, a liquid-heater, and means whereby the heated liquid is caused to pass over the cooler liquid in said chambers L, substantially as described.

11. In a liquid-purifying apparatus, the combination of the following elements, viz: a steam-generator D; pipes or passages E, A, c, d; chambers C, B; one or more series L of eliminating-chambers, each of said chambers partially filled with comparatively cool liquid, and means whereby heated liquid coming through the passage c will be caused to pass over the cooler liquid within the chambers, and thence through the passage d, substantially as and for the purpose described.

12. In a liquid-purifying apparatus, the combination of a separator M, one or more series L of eliminating-chambers, and means whereby mineral, vegetable, and other foreign substances, held in suspension in the liquid entering the eliminating-chambers through the pipe c will be precipitated to the bottom of said chambers, and the purified liquid delivered into the pipe or passage d, a liquid-heater in communication with the pipe c, and means whereby the heated liquid passing through the said passage c is caused to pass over the cooler liquid in said chambers, substantially as and for the purpose described.

13. In a liquid-purifying apparatus, the combination of a separator M; one or more series L of eliminating-chambers, each of said chambers containing a liquid of comparatively low temperature; and means whereby heated liquid, from the passage c, will be caused to flow over the liquid of lower temperature within the eliminating-chambers, thence into the passage d, substantially as and for the purpose described.

14. In a liquid-purifying apparatus, the combination of a liquid-heater, one or more series L of eliminating-chambers in communication with said heater and containing liquid of a comparatively low temperature, each of said chambers being connected at its upper side or top to the one vertically adjacent to it by one or more pipes or passages, and means whereby sediment collecting in the bottom of said chambers may be removed therefrom, substantially as described.

15. In a liquid-purifying apparatus, the combination of one or more series of eliminating-chambers containing a cool liquid, each of said chambers being connected at its upper side or top to the one vertically adjacent to it by one or more pipes or passages, and its bottom or lower side with one or more pipes or passages, a liquid-heater, a communication between the heater and said chambers, and means whereby the heated liquid is caused to pass over the cool liquid in said chambers, substantially as described.

16. In a liquid-purifying apparatus, the combination of one or more series of eliminating-chambers, containing cool liquid, each of said chambers being connected at its upper side or top to the one vertically adjacent to it by one or more pipes or passages, and plugs or caps K, a liquid-heater in communication with said chambers, and means whereby the heated liquid is caused to pass over the cool liquid, substantially as and for the purpose described.

17. In a liquid-purifying apparatus, the combination of one or more series of eliminating-chambers containing cool liquid, each of said chambers being connected at its upper side or top to the one vertically adjacent to it by one or more pipes or passages, plugs or caps K, and one or more pipes or passages connecting each of said chambers at its bottom or lower side to the one vertically adjacent to it, a liquid-heater in communication with said chambers, and means whereby the heated liquid is caused to pass over the cool liquid, substantially as and for the purpose described.

18. A liquid-purifying apparatus comprising a liquid-heater, a liquid-supply in communication with the heater, a chamber containing a liquid stratum of a relatively lower temperature, and means for forcing the heated liquid across the said relatively lower liquid stratum, substantially as described.

19. A liquid-purifying apparatus comprising a heater having an inlet and an outlet, a liquid-supply in communication with the inlet, a chamber inclosing a liquid stratum of a relatively lower temperature than the heated liquid, the said liquid stratum being in communication with the outlet of the heater, and means for forcing the heated liquid across the liquid stratum of a relatively lower temperature, substantially as described.

20. A liquid-purifying apparatus comprising a heater having a liquid-inlet and a liquid-outlet, a liquid-supply in communication with the inlet, a liquid-stratum chamber in communication with the heater-outlet and containing a liquid stratum of a relatively lower temperature than the heated liquid, and means for forcing the heated liquid across the liquid stratum of a relatively lower temperature, substantially as and for the purpose described.

ISAAC V. HOLMES.

Witnesses:
M. A. KENNEDY,
CHARLES S. HILL.